United States Patent
Simske et al.

(10) Patent No.: US 7,499,591 B2
(45) Date of Patent: Mar. 3, 2009

(54) DOCUMENT CLASSIFIERS AND METHODS FOR DOCUMENT CLASSIFICATION

(75) Inventors: Steven J. Simske, Fort Collins, CO (US); David W. Wright, Stoneham, MA (US); Margaret M. Sturgill, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 11/090,788

(22) Filed: Mar. 25, 2005

(65) Prior Publication Data

US 2006/0218134 A1    Sep. 28, 2006

(51) Int. Cl.
*G06K 9/62* (2006.01)

(52) U.S. Cl. ............... 382/224; 382/159; 707/6; 707/7

(58) Field of Classification Search ............ 382/224, 382/225, 159, 227; 707/1, 2, 3, 4, 5, 6, 102, 707/204, 7; 715/234
See application file for complete search history.

(56) References Cited

U.S. PATENT DOCUMENTS

| | | | |
|---|---|---|---|
| 5,873,080 A | 2/1999 | Coden et al. | |
| 6,078,918 A | 6/2000 | Allen et al. | |
| 6,321,224 B1 | 11/2001 | Beall et al. | |
| 6,636,848 B1 | 10/2003 | Aridor et al. | |
| 6,701,333 B2 * | 3/2004 | Suermondt et al. | 707/204 |
| 6,792,415 B2 | 9/2004 | Shih et al. | |
| 6,976,207 B1 * | 12/2005 | Rujan et al. | 715/234 |
| 7,062,498 B2 * | 6/2006 | Al-Kofahi et al. | 707/101 |
| 7,185,008 B2 * | 2/2007 | Kawatani | 707/6 |
| 7,242,810 B2 * | 7/2007 | Chang | 382/227 |
| 7,283,998 B2 * | 10/2007 | Moon et al. | 707/5 |
| 7,356,168 B2 * | 4/2008 | Tavares | 382/115 |
| 7,356,604 B1 * | 4/2008 | Roma | 709/231 |
| 7,370,024 B2 * | 5/2008 | Tsukamoto | 706/46 |
| 7,376,635 B1 * | 5/2008 | Porcari et al. | 707/1 |
| 2001/0044791 A1 | 11/2001 | Richter et al. | |
| 2003/0046297 A1 * | 3/2003 | Mason | 707/102 |
| 2003/0174179 A1 * | 9/2003 | Suermondt et al. | 345/853 |
| 2003/0177118 A1 * | 9/2003 | Moon et al. | 707/5 |
| 2004/0015775 A1 | 1/2004 | Simske et al. | |
| 2004/0133560 A1 | 7/2004 | Simske et al. | |
| 2006/0100852 A1 * | 5/2006 | Gamon et al. | 704/9 |
| 2006/0136410 A1 * | 6/2006 | Gaussier et al. | 707/5 |
| 2007/0136288 A1 * | 6/2007 | Shimada et al. | 707/7 |

OTHER PUBLICATIONS

Xiofan Lin, et al, Performance analysis of pattern classifier combination by plurality voting, 2003, 25 pages, Hewlett-Packard Laboratories, 1501 Page Mill Road, MS 1126, Palo Alto, CA 94304, USA.

* cited by examiner

*Primary Examiner*—Gregory M Desire (57) ABSTRACT

A method of classifying a document includes providing a plurality of classifier engines and classifying the document using output from one or more of the classifier engines based on a comparison of one or more metrics for each classifier engine. In another embodiment, a method of classifying a document comprises providing a plurality of classifier engines and determining one or more metrics for each classifier engine. These metrics are used to determine how to use the classifier engines to classify the document, and the document is classified accordingly. A further embodiment includes a document classifier utilizing a plurality of classifier engines. In yet another embodiment, a computer-readable medium contains instructions for controlling a computer system to perform a method of using a plurality of classifier engines to classify a document.

28 Claims, 8 Drawing Sheets

DOCUMENT CLASSIFIERS AND METHODS FOR DOCUMENT CLASSIFICATION

BACKGROUND OF THE INVENTION

This invention relates generally to classifying documents and more particularly to using a plurality of classifier engines to classify documents.

The growth of computer technology has provided users with many capabilities for creating electronic documents. Electronic documents can also be obtained from image acquisition devices such as scanners or digital cameras, or read into memory from a data storage device (e.g., in the form of a file). Modern computers enable users to electronically obtain or create vast numbers of documents varying in size, subject matter, and format. These documents may be located on a personal computer, network, or other storage medium.

With the large number of electronic documents accessible on computers, particularly through the use of networks such as the Internet, classifying these documents enables users to more easily locate related documents. Document classification is an important step in a variety of document processing tasks such as archiving, indexing, re-purposing, data extraction, and other automated document understanding operations. In classification, a document is assigned to one or more sets or classes of documents with which it has commonality—usually as a consequence of shared topics, concepts, ideas and subject areas.

A variety of document classification engines or algorithms have been developed in recent years. Performance of these engines varies from engine to engine, but is generally limited due to computers being historically poor at performing heuristic tasks. Common commercial document classifier engines use a single technology and approach to solve the classification problem. Expert users can tune these classifier engines to obtain better results, but this requires significant classifier training with high quality example documents.

Accordingly, it would be desirable to have a document classifier that overcomes these drawbacks.

SUMMARY OF THE INVENTION

The above-mentioned need is met by the present invention, which provides in one embodiment a method of classifying a document comprising providing a plurality of classifier engines and classifying the document using output from one or more of the classifier engines based on a comparison of one or more metrics for each classifier engine.

In another embodiment, a method of classifying a document comprises providing a plurality of classifier engines and determining one or more metrics for each classifier engine. These metrics are used to determine how to use the classifier engines to classify the document, and the document is classified accordingly.

In a further embodiment, a document classifier comprises a plurality of classifier engines, means for generating a metric for each classifier engine, and means for comparing the metrics. The document classifier further includes means for classifying a document using output from one or more of the classifier engines in response to the means for comparing.

In yet another embodiment, a computer-readable medium contains instructions for controlling a computer system to perform a method of using a plurality of classifier engines to classify a document. The method comprises classifying the document using output from one or more of the classifier engines based on a comparison of one or more metrics for each classifier engine.

In an additional embodiment, a computer-readable medium contains instructions for controlling a computer system to perform a method of using a plurality of classifier engines to classify a document. The method comprises determining one or more metrics for each classifier engine, using the metrics to determine how to use the classifier engines to classify the document, and classifying the document accordingly.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Referring to the drawings wherein identical reference numerals denote the same elements throughout the various views, the present invention relates to electronic document classification schemes that use multiple classifier engines in series and/or parallel patterns (i.e., "meta-algorithmic" patterns), to provide improved classification results. As used herein, the term "classifier engine" refers to any algorithm or computer program that is capable of classifying documents.

In one embodiment, a software tool, which is referred to herein as a "meta-algorithmic document classifier," classifies documents using output from one or more of the multiple classifier engines based on a comparison of engine metrics. That is, the meta-algorithmic document classifier uses a comparison of the engine metrics to determine how the various classifier engines are used to classify a document. As used herein, "metric," as associated with a classifier engine, refers to either an output of the engine (such as a list of probabilities) or an attribute of the engine (such as precision, recall or accuracy). The multiple classifier engines can be selected from virtually any existing or later developed engine. The various classifier engines can also encompass a wide variety of classifier technologies, including, but not limited to, neural net, Bayesian, and natural language processing technologies. Also, there are almost no constraints on how many classifier engines are used; while there would typically be at least three or four engines, many more can be used. All of the patterns described in more detail below (FIGS. 2-7) have been shown to improve results, under some circumstances, even when deployed with only two engines.

Figure 1:
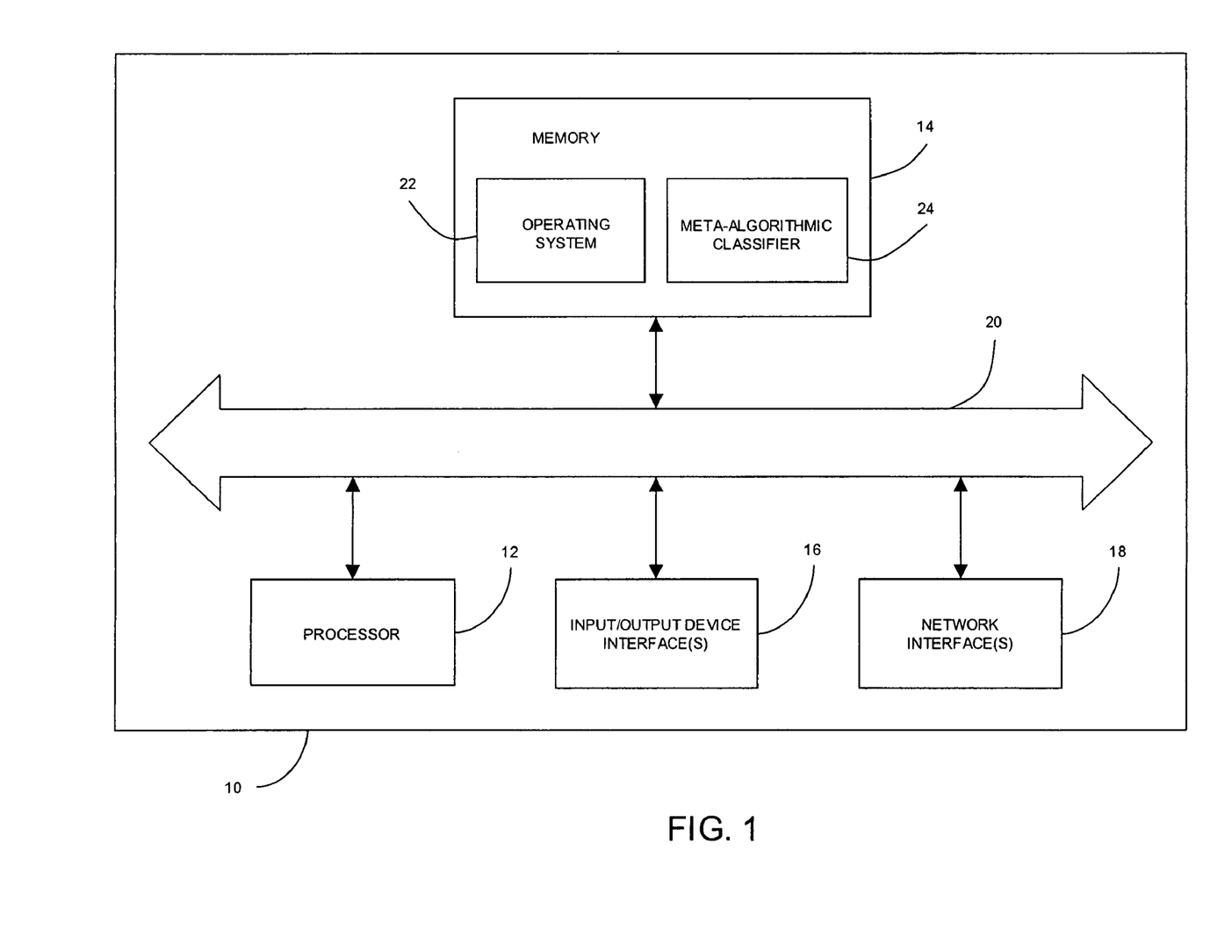
FIG. 1 is a block diagram of one exemplary computer system implementing a meta-algorithmic document classifier.

FIG. 1 illustrates an exemplary computer system 10, on which a meta-algorithmic document classifier can be implemented. (While one exemplary computer system is described herein for purposes of illustration, it should be noted that the present invention is not limited to implementation on this particular system and many other systems are possible.) Generally, the computer system 10 may include a processor 12, a memory 14, input/output device interface(s) 16, and network interface(s) 18 that are communicatively coupled via a system bus 20. The system bus 20 may be any of several types of bus structures, including wired or wireless connections, and may comprise multiple bus structures interconnected by various bridges, adapters and/or controllers.

The processor 12 is a hardware device for executing software that can be stored in the memory 14. The processor 12 can be any custom-made or commercially available processor, including a central processing unit (CPU), an auxiliary processor among several processors associated with the computer system 10, a semiconductor-based microprocessor (in the form of a microchip), or a macroprocessor. When the computer system 10 is in operation, the processor 12 is configured to execute software stored within the memory 14, to communicate data to and from the memory 14, and to generally control operations of the computer system 10. The memory 14 can include any one or combination of volatile memory elements (e.g., random access memory (RAM, such as dynamic RAM or DRAM, static RAM or SRAM, etc.)) and nonvolatile memory elements (e.g., read-only memory (ROM), hard drives, tape drives, compact discs (CD-ROM), floppy discs, etc.). Moreover, the memory 14 may incorporate electronic, magnetic, optical, and/or other types of storage media now known or later developed. Note that the memory 14 can have a distributed architecture, where various components are situated remote from one another, but can be accessed by processor 12.

The memory 14 may contain several software programs, each of which typically comprises an ordered listing of executable instructions for implementing logical functions. In the illustrated example, the software in the memory 14 includes an operating system 22 and a meta-algorithmic document classifier 24, although other software programs may be present. The operating system 22 preferably controls the execution of the meta-algorithmic document classifier 24 and provides scheduling, input-output control, file and data management, memory management, and communication control and related services.

The input/output device interface(s) 16 may include one or more of a number of device interfaces for communicating via various devices, such as but not limited to, a keyboard, a mouse or other suitable pointing device, a microphone, a scanner, etc. Furthermore, the input/output device interface (s) 16 may also include known or later developed output devices, for example but not limited to, a printer, a monitor, an external speaker, etc. The network interface(s) 18 may include a host of devices capable of establishing communication sessions between the computer system 10 and a computer network such a local area network (LAN), a wide area network (WAN), or the Internet. The network interface(s) 18 may include but are not limited to, a modem (for accessing another device, system, or network), a radio frequency (RF) or other transceiver, a telephonic interface, a bridge, an optical interface, a router, etc.

The meta-algorithmic document classifier 24 can be embodied in any computer-readable medium for use by the computer system 10. In the illustrated embodiment, the meta-algorithmic document classifier 24 is contained in the memory 14. This can be accomplished in a number of ways. For instance, the meta-algorithmic document classifier 24 could be downloaded onto an internal memory element (such as a hard disk or integrated circuit memory device) of the computer system 10 from a removable computer-readable medium (such as a floppy disk, CD-ROM, or the like) or from a remote computer system over the Internet or other computer network via the network interface(s) 18. The meta-algorithmic document classifier 24 could also reside on a removable computer-readable medium inserted into an appropriate drive of the computer system 10 and be accessed from there. With this approach, the meta-algorithmic document classifier 24 would be accessed directly from the removable computer-readable medium, instead of being transferred to an internal memory element. As an alternative to being contained in the memory 14, the meta-algorithmic document classifier 24 could reside on a remote computer system and be accessed by the computer system 10 over a network via the network interface(s) 18.

As used herein, the term "computer-readable medium" refers generally to any medium or means that can store, communicate, propagate, and/or transport a program for use by or in connection with a computer or similar system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
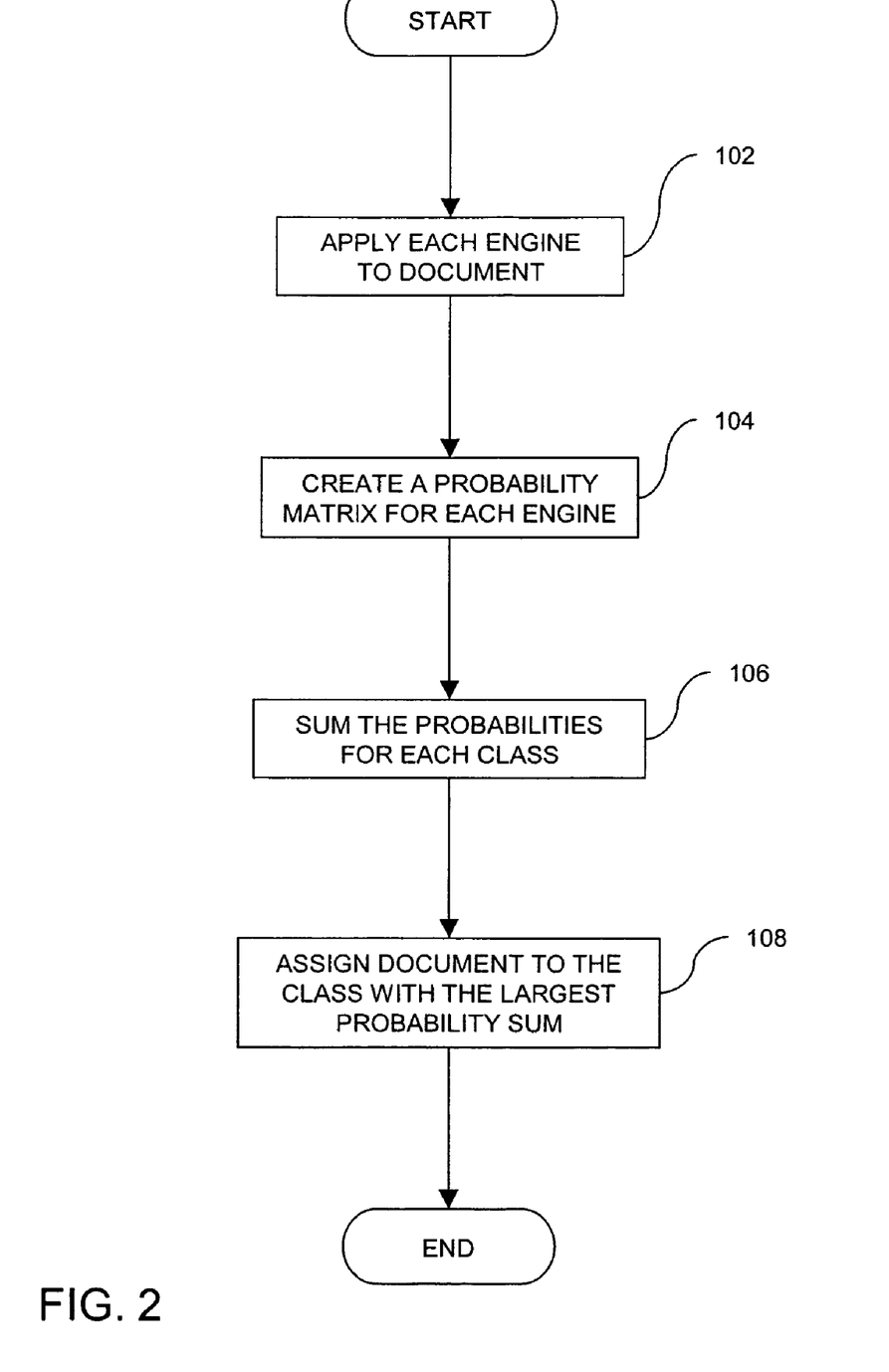
FIG. 2 is a flow chart illustrating a first embodiment of a method for classifying documents.

Turning now to FIG. 2, one embodiment of a method for classifying documents using the meta-algorithmic document classifier 24 is shown. While the methods are described herein in the context of classifying a single document, it should be noted that the methods could be repeated to classify additional documents.

The method begins by applying each classifier engine to the document to be classified, as shown at block 102. That is, each engine is independently operated in its intended fashion so as to generate an individual classification result for the document. Typically, the engines will be attempting to determine which class, out of a group of possible classes, the document should be assigned to (i.e., classified in). To this end, the probabilities of the document being classified into each class are generated for each engine. Most available engines give these probabilities as an output. Each engine reports its estimate of probabilities for classification to each class. If any of the engines being used do not provide probabilities output, then the probabilities must be generated in another manner.

One approach for producing probabilities if the classifier gives simply a single "best" result is to assign this best result a probability value of x, and the other N−1 classes (where N is the total number of classes) a value of $(1-x)/(N-1)$ each, where $x > [(1-x)/(N-1)]$. A useful starting point has been 0.50 for x, and then $0.50/(N-1)$ for the other classes. Weighting the individual engines and transforming the probability space, described in more detail below, will tend to even out the effects of estimating the value for x. This approach, with obvious modifications, can be used for any other "partial assignment" of probabilities. E.g. if the engine provides 3 best classes identified, then the residual assignment to the other N−3 classes can be set so that all of them are just less (e.g. 50 or 75% as much) as the $3^{rd}$ class, etc. etc.

Next, at block 104, the probabilities obtained are used to create a probability confusion matrix, which is a matrix that lists the probabilities of a document being classified into each of a group of possible classes by each engine. By way of example only, Table 1 shows a sample probability confusion matrix for a process in which there are three classifier engines (Engines 1, 2 and 3) and four possible document classes (Classes A, B, C and D). In this instance, Engine 1 reported that the probability, p, of the document being classified in Class A is 0.22, in Class B is 0.33, in Class C is 0.25 and in Class D is 0.20. Thus, Engine 1, if used alone, would determine that the document should be classified in Class B, as this had the highest probability of 0.33. On the other hand, Engine 2 indicates that the document should be classified in Class D (which has the highest of the four Engine 2 probabilities at 0.30), and Engine 3 indicates that the document should be classified in Class C (which has the highest of the four Engine 3 probabilities at 0.32). Note that in the sample of Table 1, the probabilities for each engine are made to sum to 1.0. This process, called normalization, "levels the field" among the engines for more accurate results and, as will be discussed in more detail below, permits more intelligent weighting of the engines based on overall confidence in the respective engines.

TABLE 1

| CLASSIFIER ENGINE | p(Class A) | p(Class B) | p(Class C) | p(Class D) |
|---|---|---|---|---|
| 1 | 0.22 | 0.33 | 0.25 | 0.20 |
| 2 | 0.28 | 0.22 | 0.20 | 0.30 |
| 3 | 0.30 | 0.20 | 0.32 | 0.18 |
| COMBINED | 0.80 | 0.75 | 0.77 | 0.68 |

The probabilities for each class are then summed, as shown at block 106. In the example of Table 1, the probability sum for Class A is 0.80, for Class B is 0.75, for Class C is 0.77, and for Class D is 0.68. The final step, at block 108, is to compare the probability sums for all of the classes and classify the document by assigning it to the class with the largest probability sum. In the example of Table 1, Class A has the largest probability sum of 0.80. Thus, the document would be classified as belonging to Class A. This is an emergent answer in that it is an answer that none of the individual engines provided independently.

Figure 3:
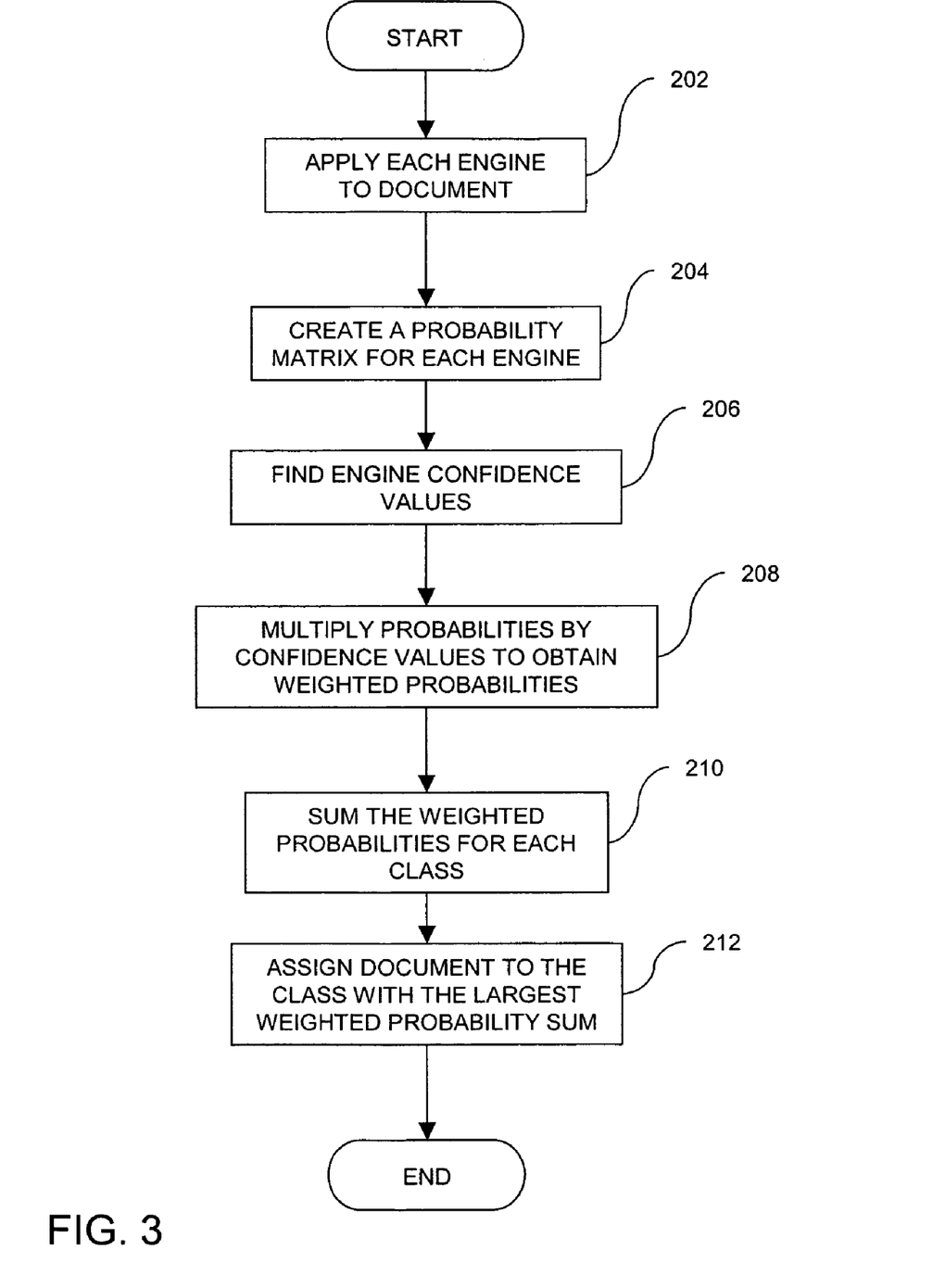
FIG. 3 is a flow chart illustrating a second embodiment of a method for classifying documents.

FIG. 3 shows a modified embodiment of a document classifying method that is also based on a probability confusion matrix. In this embodiment, the method again begins by applying each classifier engine to the document to be classified, as shown at block 202, so that the probabilities of the document being classified into each class of a group of possible classes is generated for each engine. These probabilities are used to create a probability confusion matrix, as shown at block 204 and in the same manner as described above.

The next step, at block 206, is to find confidence values for each engine in order to weight the classifier engines based on the confidence in their respective results. That is, more weight is given to the results of the engines garnering higher confidence and less weight is given to the results of the engines garnering lower confidence. A wide variety of approaches for determining confidence values or weights can be used. For instance, confidence values can be determined based on engine accuracy (which is determined for each engine through a "training" procedure discussed below). Confidence values can also be determined based on an assumption of engine voting. For example, optimal confidence values or weights can be determined using the techniques described in the publication "Performance analysis of pattern classifier combination by plurality voting," Xiaofan Lin et al., *Hewlett-Packard Technical Report* HPL-2002-150 (R.1), 2003, and particularly Equation 7 found on page 5 of that publication.

Once the confidence values are found for each engine, each engine's probabilities from the probability confusion matrix are multiplied by the corresponding engine confidence value to obtain weighted probability values, as shown at block 208. This results in a "weighted" probability confusion matrix. By way of example only, Table 2 shows a sample weighted probability confusion matrix having the same three classifier engines (Engines 1, 2 and 3), four possible document classes (Classes A, B, C and D) and base probabilities used in the example of Table 1. Again by way of example only, Engine 1 is assigned a confidence value of 2.0, Engine 2 is assigned a confidence value of 1.0, and Engine 3 is assigned a confidence value of 0.5. Table 2 shows the resulting weighted probabilities (i.e., the probabilities in row 1 of Table 1 have been multiplied by 2.0, the probabilities in row 2 of Table 1 have been multiplied by 1.0, and the probabilities in row 3 of Table 1 have been multiplied by 0.5 to obtain the weighted probabilities shown in Table 2.)

TABLE 2

| CLASSIFIER ENGINE | p(Class A) | p(Class B) | p(Class C) | p(Class D) |
|---|---|---|---|---|
| 1 (weight 2.0) | 0.44 | 0.66 | 0.50 | 0.40 |
| 2 (weight 1.0) | 0.28 | 0.22 | 0.20 | 0.30 |
| 3 (weight 0.5) | 0.15 | 0.10 | 0.16 | 0.09 |
| COMBINED | 0.87 | 0.98 | 0.86 | 0.79 |

Next, at block 210, the weighted probabilities for each class are summed. In the example of Table 2, the weighted probability sum for Class A is 0.87, for Class B is 0.98, for Class C is 0.86, and for Class D is 0.79. The final step, at block 212, is to compare the weighted probability sums for all of the classes and classify the document by assigning it to the class with the largest weighted probability sum. In the example of Table 2, Class B has the largest weighted probability sum of 0.98. Thus, the document would be classified as belonging to Class B. As this differs from the result obtained in the first described embodiment, it shows how using confidence values arrived at a different result.

Figure 4:
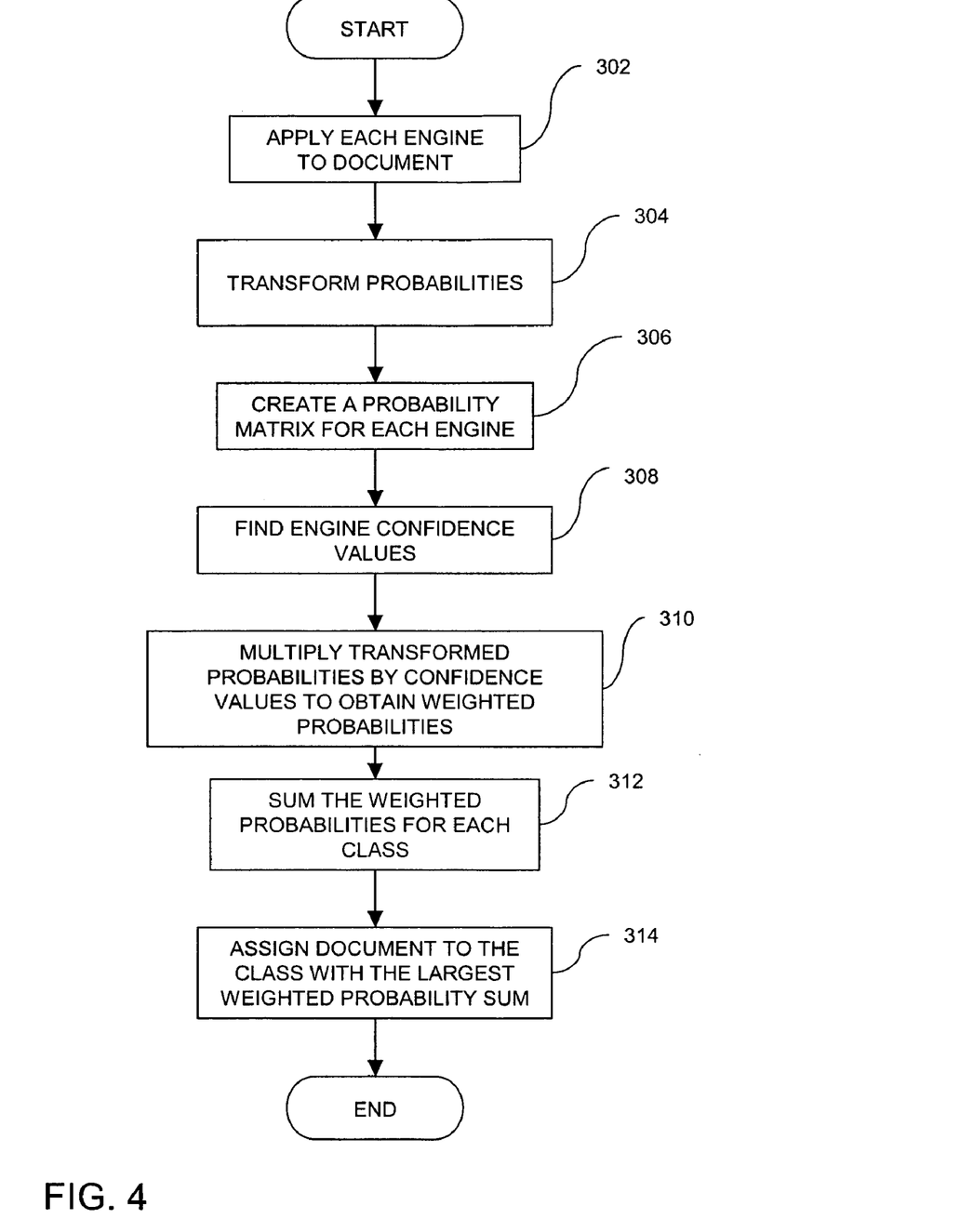
FIG. 4 is a flow chart illustrating a third embodiment of a method for classifying documents.

FIG. 4 shows a further embodiment of a document classifying method, which is another variation on the probability confusion matrix approach. In this case, a probability transformation step is added to address any concern that the probability values generated by the engines are not reliable. As before, the method again begins by applying each classifier engine to the document to be classified, as shown at block 302, so that the probabilities of the document being classified into each class of a group of possible classes is generated for each engine.

The next step is to use a "probability space correction" to transform the probabilities of one or more of the engines, as shown at block 304. The purpose of this transformation step is to "level the field" among the engines; that is, to make the mean differences between consecutively ranked classes more similar. Generally, the probabilities are transformed by raising them to a power of a transformation exponent α. That is, the engine output probability p is transformed to a new probability $p^\alpha$ wherein the transformation exponent α is preferably but not necessarily determined empirically. Please note that for this transformation to apply, the normal statistical model wherein $0 <= p <= 1$ is presumed.

Figure 5:
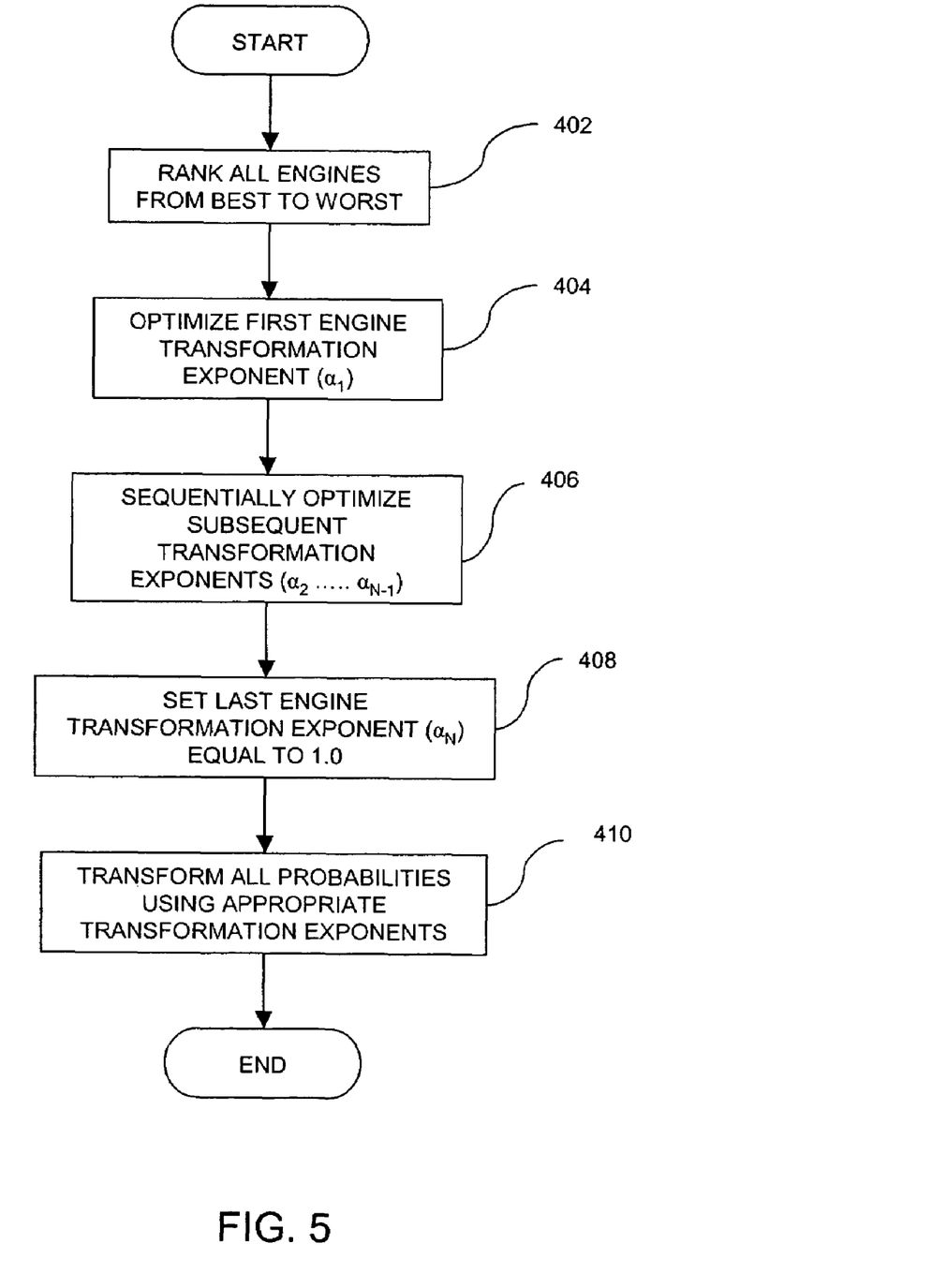
FIG. 5 is a flow chart illustrating a process for transforming classifier engine output probabilities.

Referring to FIG. 5, the probability transformation procedure of block 304, and particularly an approach for deriving transformation exponents, are described in more detail. This process begins at block 402 by ranking all of the engines from best to worst. In this case, the engines are ranked based on a comparison one or more relative metrics or attributes such as accuracy, precision and recall. These attributes can be determined for each engine through a "training" procedure using a set or corpus of training documents (i.e., documents having predetermined or known classifications). For example, an existing document corpus of 20,000 pre-classified (into 20 classes) documents is available at:

http://kdd.ics.uci.edu/databases/20newsgroups/20newsgroups.html and consists of 20,000 newsgroup articles taken from twenty Usenet newsgroups. This corpus is pre-classified (or ground truthed), with 1000 articles from each of the twenty classes. To effect training each engine is run on a set of pre-classified documents and the results from each engine are tabulated in a respective "classification" confusion matrix, where the engine classification results are compared to the known classifications. By way of example only, Table 3 provides a simple sample for when there are three classes of 100 training documents.

TABLE 3

|              | To Class A | To Class B | To Class C |
|--------------|------------|------------|------------|
| From Class A | 90         | 6          | 4          |
| From Class B | 20         | 72         | 8          |
| From Class C | 10         | 9          | 81         |

Note that each row in Table 3 sums to 100, the number of documents actually belonging to each class in this example, while the columns add up to the number of documents classified as belonging to each class. The diagonal (upper-left to lower-right) values indicate the number of correctly classified documents, and the off-diagonal values are the incorrectly classified documents. In a perfect classifying system, the diagonal elements of the matrix would all be 100, and all of the off-diagonal values would be zero. In this example, for instance, 90 out of 100 documents from Class A were correctly classified to Class A, while 6 were incorrectly classified to Class B and 4 were incorrectly classified to Class C.

From the data derived from this training procedure, certain attributes or metrics can be calculated for each engine. The engine attributes of primary concern here are precision, recall and accuracy. The precision, P, of an engine for a given class is the number of documents from that class that are assigned by the engine to that class divided by the number of documents actually in that class. The precision, P, is determined by the following equation:

$$P = \frac{\text{\# of documents correctly assigned to a class}}{\text{\# of documents actually in this class}} \times 100\%.$$

For Class A in the above example:

$$P = \frac{90}{100} \times 100\% = 90\%.$$

The recall of an engine for a given class is the number of documents from that class that are assigned by the engine to that class divided by the total number of documents assigned to that class. The recall, r, is given by the following equation:

$$r = \frac{\text{\# of documents correctly assigned to a class}}{\text{\# of total documents assigned to this class}} \times 100\%$$

For Class A in the above example:

$$r = \frac{90}{120} \times 100\% = 75\%$$

The accuracy, a, is the harmonic mean of precision and recall and is given by the following equation:

$$a = \frac{2Pr}{(P+r)}$$

For Class A in the above example:

$$a = \frac{2 \times 90\% \times 75\%}{(90\% + 75\%)} = 81.8\%$$

Accordingly, the engine attributes, particularly although not necessarily accuracy, can be used to rank the engines from best to worst. Once the engine rankings have been determined, the transformation exponent $\alpha_1$, for the first, or best, engine is optimized through an iterative, trial-and-error process using a number of training documents, as shown at block 404. (Note that this optimization can be readily automated with a steepest descent or other gradient descent technique.) This is accomplished by applying the first engine to a set of training documents, iteratively transforming the resulting probabilities with a number of transformation exponents, and iteratively using the transformed probabilities in a weighted probability confusion matrix to "classify" the training documents. The classifications obtained through this process are then compared to the known classifications of the training documents to determine the number of correctly classified documents obtained with each transformation exponent. The transformation exponent that results in the largest number of correctly classified documents is selected as optimal. By way of example, Table 4 shows a range of transformation exponents a and the corresponding number of correctly classified documents. In this example, the exponent values 0.208, 0.0775, and 0.2075 resulted in the highest number of correct documents, so a value in this range would be set as the transformation exponent for the first engine.

TABLE 4

| Value of α | # Correct |
|------------|-----------|
| 2.0        | 12677     |
| 1.0        | 12777     |
| 0.9        | 12760     |
| 0.5        | 12776     |
| 0.3        | 12800     |
| 0.275      | 12805     |
| 0.25       | 12810     |

TABLE 4-continued

| Value of α | # Correct |
|---|---|
| 0.225 | 12812 |
| 0.2125 | 12817 |
| 0.209 | 12819 |
| 0.20825 | 12819 |
| 0.208 | 12820 |
| 0.20775 | 12820 |
| 0.2075 | 12820 |
| 0.207 | 12819 |
| 0.20625 | 12819 |
| 0.2 | 12815 |
| 0.1 | 12735 |

Next, at block 406, the transformation exponents for subsequently ranked engines are sequentially optimized, while holding the previous transformation exponent steady. That is, the transformation exponent $\alpha_2$ for the second best engine is optimized through the same iterative process described above while the first transformation exponent $\alpha_1$ is held steady, then the transformation exponent $\alpha_3$ for the third best engine is optimized while the second transformation exponent $\alpha_2$ is held steady, and so on through the penultimate engine. Stated mathematically, if N engines were being used in the meta-algorithmic document classifier, then for all engines k=2 . . . N−1, the transformation exponent $\alpha_k$ is optimized while the transformation exponent $\alpha_{k-1}$ is held steady. Then, at block 408, the transformation exponent $\alpha_N$ for the last (lowest rated) engine is set equal to 1.0. (In other words, the probabilities for this engine are not actually transformed.) Finally, the probabilities for each engine are transformed using the corresponding transformation exponents, as shown at block 410.

Returning now to FIG. 4, after the probabilities are transformed at block 304, the transformed probabilities are used to create a probability confusion matrix at block 306. The next step, at block 308, is, to find confidence values for each engine in order to weight the engines based on the confidence in their respective results. The confidence values can be determined in the same manner described above. Once the confidence values are found for each engine, each engine's probabilities from the probability confusion matrix are multiplied by the corresponding engine confidence value to obtain weighted probability values, as shown at block 310, resulting in a "weighted" probability confusion matrix. Next, at block 312, the weighted, transformed probabilities for each class are summed. The final step, at block 314, is to compare the weighted probability sums for all of the classes and classify the document by assigning it to the class with the largest weighted probability sum.

Figure 6:
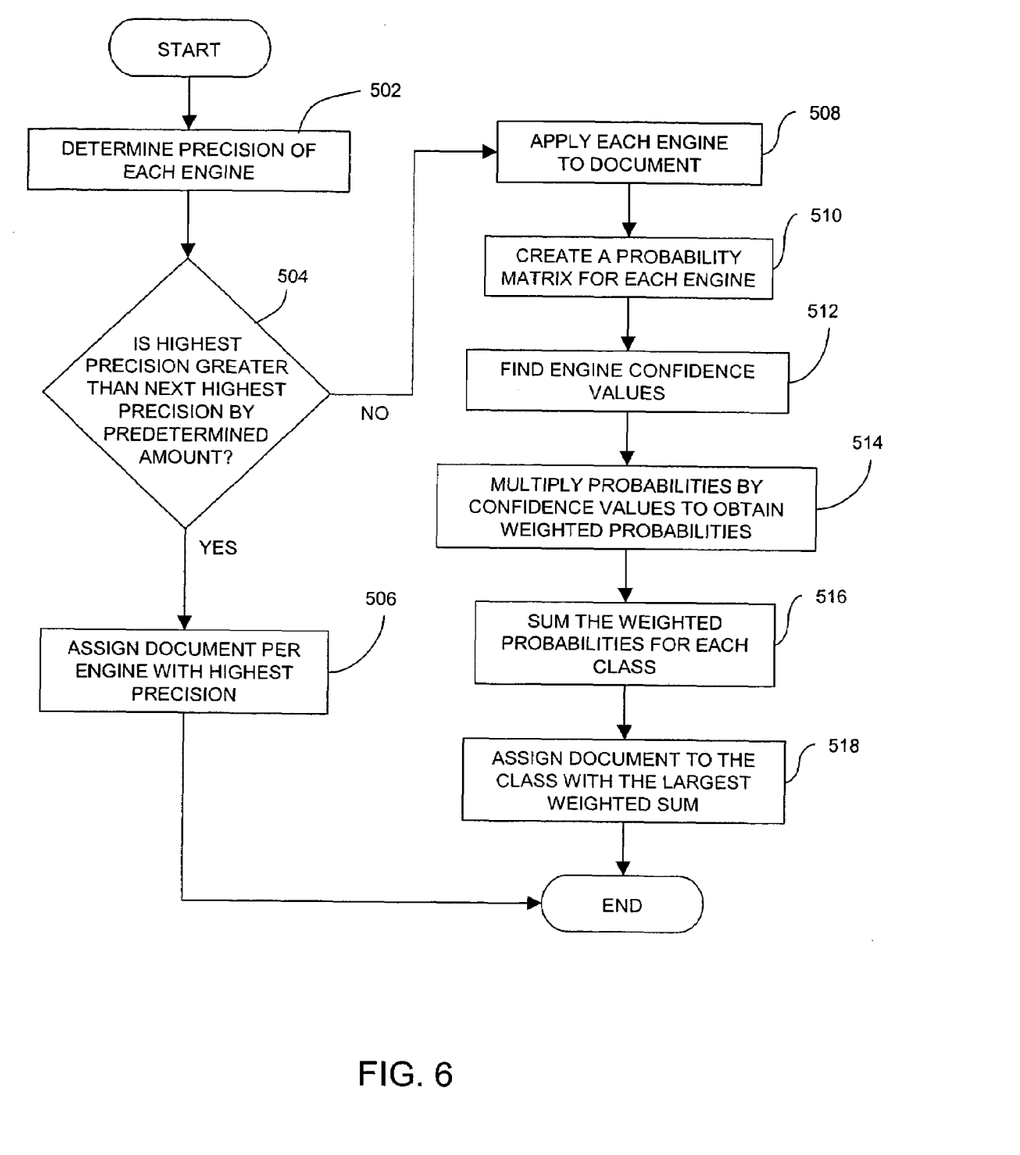
FIG. 6 is a flow chart illustrating a fourth embodiment of a method for classifying documents.

Referring to FIG. 6, another embodiment of a document classifying method using a plurality of classifier engines is shown. This embodiment begins by determining the precision of each engine at block 502. The precision can be calculated in the manner described above. Next, at block 504, the precision values for each engine are compared and a determination is made as to whether the highest precision value is greater than the next highest precision value by a predetermined amount. The magnitude of this predetermined precision differential is determined empirically (using training documents) and will vary from case-to-case. Typically, the predetermined precision differential will be in the range of about 10%-50% if the classifier engines are producing reliable p-values for all classes. We can then iterate in this range looking for peaks—if an x, (1−x)/(N−1) "fitted" assignment is used for an engine providing no output probabilities of its own, we need search at a percent no higher than the difference between x % and [(1−x)/(N−1)]%. It should be noted that the precision differential could be refined over time in a feedback loop, i.e., this value is not absolute but relative to the data being processed. If this precision differential condition is met, then the engine with the highest precision is used to classify the document at block 506, thereby completing the classification process. If the precision differential condition is not met, then process moves on to a weighted probability matrix analysis, beginning at block 508 by applying each classifier engine to the document to be classified so that the probabilities of the document being classified into each class of a group of possible classes is generated for each engine. These probabilities are used to create a probability confusion matrix, at block 510, in the same manner as described above. The next step, at block 512, is to find confidence values for each engine in order to weight the engines based on the confidence in their respective results. The confidence values can be determined in the same manner described above. Once the confidence values are found for each engine, each engine's probabilities from the probability confusion matrix are multiplied by the corresponding engine confidence value to obtain weighted probability values, at block 514. This results in a weighted probability confusion matrix. Next, at block 516, the weighted probabilities for each class are summed. The final step, at block 518, is to compare the weighted probability sums for all of the classes and classify the document by assigning it to the class with the largest weighted probability sum.

Figure 7:
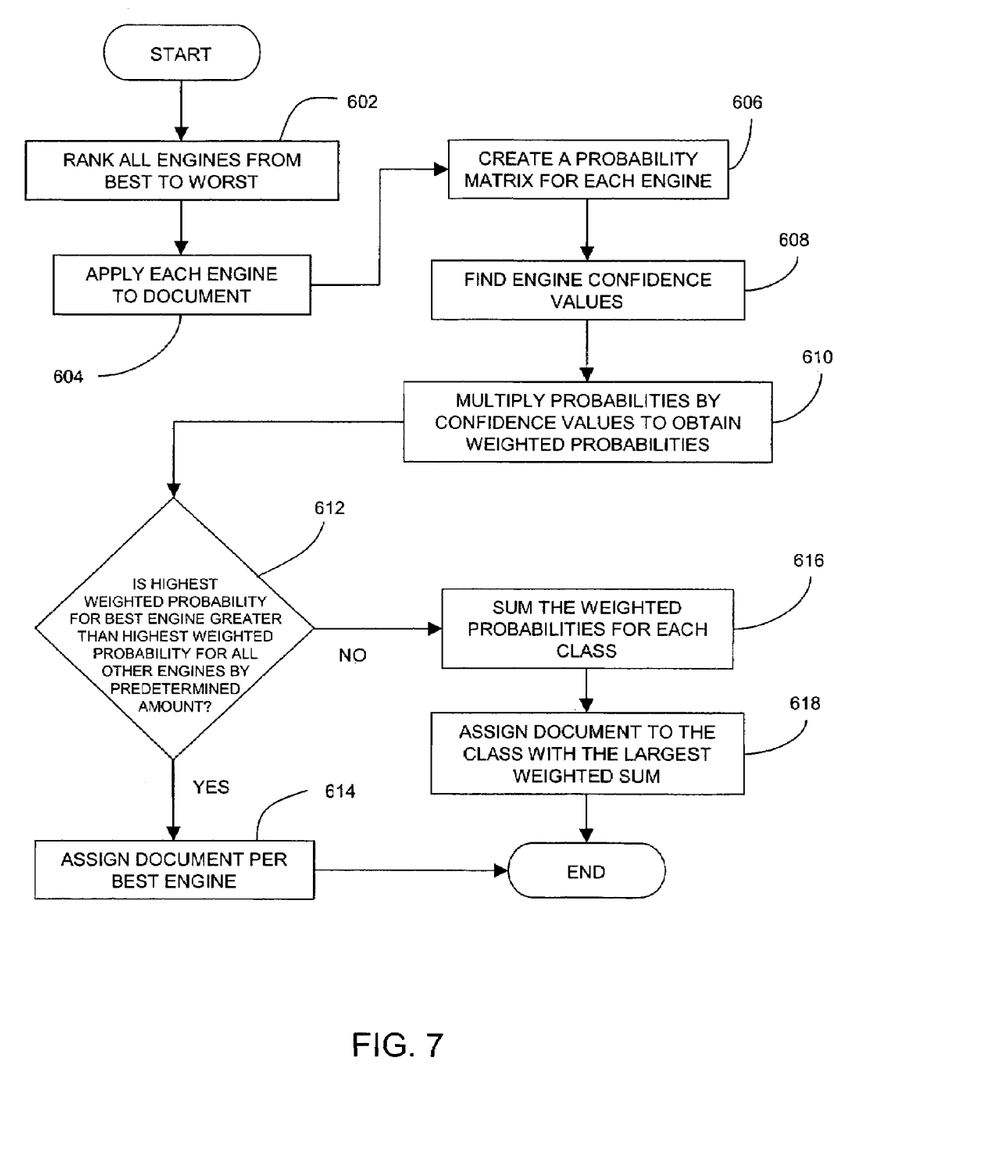
FIG. 7 is a flow chart illustrating a fifth embodiment of a method for classifying documents.

FIG. 7 shows yet another embodiment of a document classifying method using a plurality of classifier engines. This embodiment begins at block 602 by ranking all of the engines from best to worst. As described above, the engines are ranked based on a comparison one or more attributes or metrics, such as accuracy, precision or recall, which are determined using training documents. Generally, the best engine will be deemed to be the most accurate engine, although other engine attributes can be used in the ranking. Next, at block 604, each classifier engine is applied to the document to be classified so that the probabilities of the document being classified into each class of a group of possible classes are generated for each engine. These probabilities are used to create a probability confusion matrix, at block 606, in the same manner as described above. The next step, at block 608, is to find confidence values for each engine in order to weight the engines based on the confidence in their respective results. The confidence values can be determined in the same manner described above. Once the confidence values are found for each engine, each engine's probabilities from the probability confusion matrix are multiplied by the corresponding engine confidence value to obtain weighted probability values, at block 610. This results in a weighted probability confusion matrix.

Next, at block 612, the highest weighted probability value for the best engine (as determined at block 602) is compared to the highest weighted probability values for all of the other engines, and a determination is made as to whether the best engine's highest weighted probability value is greater than the highest weighted probability values for each other engine by a predetermined amount. In other words, does the best engine have a predetermined confidence differential? The magnitude of this predetermined confidence differential is determined empirically (using training documents) and will vary from case-to-case. Typically, the confidence differential will be in the range of about 0.10-0.50. It should be noted that the confidence differential could be refined over time in a feedback loop based on the data being processed. If the confidence differential condition is met, then the best engine is used to classify the document at block 614, thereby completing the classification process. If the confidence differential condition is not met, then the process continues at block 616 by summing the weighted probabilities for each class. The final step, at block 618, is to compare the weighted probability sums for all of the classes and classify the document by assigning it to the class with the largest weighted probability sum.

Figure 8:
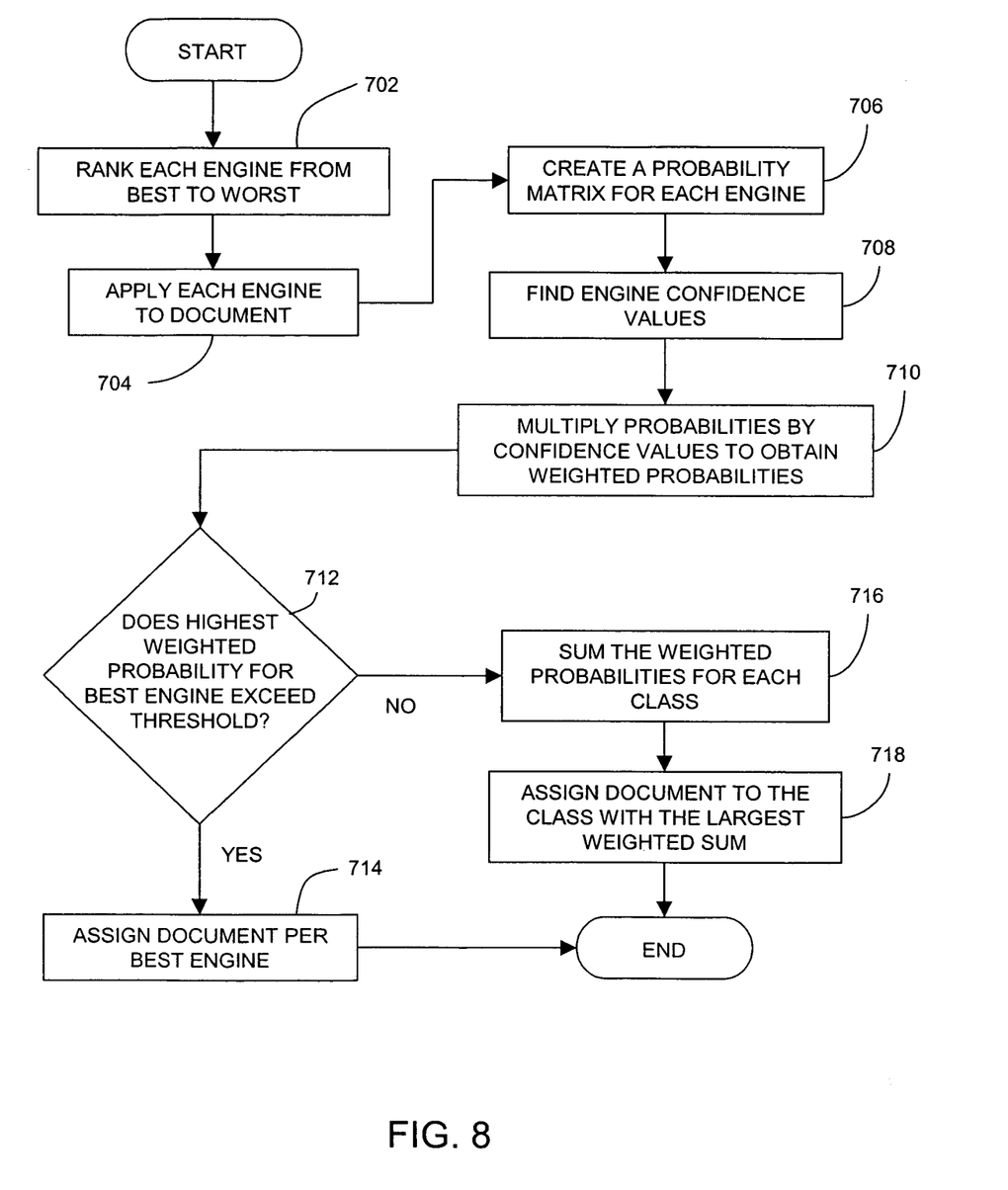
FIG. 8 is a flow chart illustrating a sixth embodiment of a method for classifying documents.

FIG. 8 shows another embodiment of a document classifying method using a plurality of classifier engines. This embodiment begins at block 702 by ranking all of the engines from best to worst. As described above, the engines are ranked based on a comparison one or more attributes or metrics, such as accuracy, precision or recall, which are determined using training documents. Generally, the best engine will be deemed to be the most accurate engine, although other engine attributes can be used in the ranking. Next, at block 704, each classifier engine is applied to the document to be classified so that the probabilities of the document being classified into each class of a group of possible classes are generated for each engine. These probabilities are used to create a probability confusion matrix, at block 706, in the same manner as described above. The next step, at block 708, is to find confidence values for each engine in order to weight the engines based on the confidence in their respective results. The confidence values can be determined in the same manner described above. Once the confidence values are found for each engine, each engine's probabilities from the probability confusion matrix are multiplied by the corresponding engine confidence value to obtain weighted probability values, at block 710. This results in a weighted probability confusion matrix.

Next, at block 712, the highest weighted probability value for the best engine (as determined at block 702) is considered to determine whether it exceeds a predetermined threshold. In other words, does the best engine have a predetermined absolute confidence value? The magnitude of this predetermined threshold is determined empirically (using training documents) and will vary from case-to-case. Typically, the threshold will be about 0.75. It should be noted that this threshold could be refined over time in a feedback loop based on the data being processed. If the absolute confidence condition is met, then the best engine is used to classify the document at block 714, thereby completing the classification process. If the absolute confidence condition is not met, then the process continues at block 716 by summing the weighted probabilities for each class. The final step, at block 718, is to compare the weighted probability sums for all of the classes and classify the document by assigning it to the class with the largest weighted probability sum.

The foregoing has described a number of meta-algorithmic patterns for improving document classification results. Other possible patterns include using comparing the individual engine classifications and determining whether a majority of the engines agree on the classification. If so, then the majority classification would be used. If not, then the classification result obtained by the best engine (e.g., most accurate) would be used. Another possible pattern would be to the majority classification if a majority of the engines agreed, or, if not, and then use a weighted probabilities confusion matrix analysis. Yet another possible pattern would be to the best engine with an absolute confidence (i.e., the highest probability exceeding a predetermined threshold). If the best engine did not meet the threshold, then use the second best engine.

While specific embodiments of the present invention have been described, it will be apparent to those skilled in the art that various modifications thereto can be made without departing from the spirit and scope of the invention as defined in the appended claims.

What is claimed is:

1. A method of classifying a document comprising:
    using a processor (or computer) to perform the steps of:
    classifying said document using output from one or more of said classifier engines based on a comparison of one or more metrics for each classifier engine;
    using a set of training documents to determine a precision value for each classifier engine;
    identifying a highest precision value and a second highest precision value;
    determining if said highest precision value is greater than said second highest precision value by a predetermined amount;
    if so, using output from the classifier engine having said highest precision value to classify said document; and
    if not, generating for each classifier engine, a list of probabilities of said document being classified by each classifier engine into each one of a group of possible classes, summing said probabilities for each class, and classifying said document into the class with the largest sum of probabilities.

2. The method of claim 1 wherein classifying said document includes:
    generating, for each classifier engine, a list of probabilities of said document being classified by each classifier engine into each one of a group of possible classes;
    summing said probabilities for each class; and
    classifying said document into the class with the largest sum of probabilities.

3. The method of claim 2 further comprising finding confidence values for each classifier engine and multiplying each classifier engine's probabilities by the corresponding classifier engine confidence value prior to summing said probabilities for each class.

4. The method of claim 3 further comprising finding a transformation exponent for each classifier engine and transforming each classifier engine's probabilities by raising the probabilities to a power of the corresponding transformation exponent prior to multiplying each classifier engine's probabilities by the corresponding classifier engine confidence value.

5. The method of claim 4 wherein said transformation exponent for each classifier engine is iteratively optimized using a set of training documents.

6. The method of claim 1 further comprising finding confidence values for each classifier engine and multiplying each classifier engine's probabilities by the corresponding classifier engine confidence value prior to summing said probabilities for each class.

7. A method of classifying a document comprising:
    using a processor (or computer) to perform the steps of:
    classifying said document using output from one or more of said classifier engines based on a comparison of one or more metrics for each classifier engine;
    using a set of training documents to rank said classifier engines from best to worst;
    generating, for each classifier engine, a list of probabilities of said document being classified by each classifier engine into each one of a group of possible classes;
    determining if the best classifier engine has a highest probability that is greater than the highest probability of each other classifier engine by a predetermined amount;
    if so, using output from said best classifier engine to classify said document; and if not, summing said probabilities for each class, and classifying said document into the class with the largest sum of probabilities.

8. The method of claim 7 further comprising finding confidence values for each classifier engine and multiplying each classifier engine's probabilities by the corresponding classifier engine confidence value prior to determining if the best classifier engine has a highest probability that is greater than the highest probability of each other classifier engine by a predetermined amount.

9. The method of claim 7 wherein said classifier engines are ranked from best to worst based on engine accuracy.

10. A method of classifying a document comprising:
using a processor (or computer) to perform the steps of:
classifying said document using output from one or more of said classifier engines based on a comparison of one or more metrics for each classifier engine;
using a set of training documents to rank said classifier engines from best to worst;
generating, for each classifier engine, a list of probabilities of said document being classified by each classifier engine into each one of a group of possible classes;
determining if the best classifier engine has a highest probability that exceeds a predetermined threshold;
if so, using output from said best classifier engine to classify said document; and
if not, summing said probabilities for each class, and classifying said document into the class with the largest sum of probabilities.

11. The method of claim 10 further comprising finding confidence values for each classifier engine and multiplying each classifier engine's probabilities by the corresponding classifier engine confidence value prior to determining if the best classifier engine has a highest probability that exceeds a predetermined threshold.

12. The method of claim 10 wherein said classifier engines are ranked from best to worst based on engine accuracy.

13. A method of classifying a document comprising:
using a processor (or computer) to perform the steps of:
determining one or more metrics for each classifier engine;
using said metrics to determine how to use said classifier engines to classify said document; and
classifying said document accordingly, wherein
determining one or more metrics includes using a set of training documents to determine a precision value for each classifier engine and identifying a highest precision value and a second highest precision value, and wherein classifying said document includes:
determining if said highest precision value is greater than said second highest precision value by a predetermined amount;
if so, using output from the classifier engine having said highest precision value to classify said document; and
if not, generating, for each classifier engine, a list of probabilities of said document being classified by each classifier engine into each one of a group of possible classes, summing said probabilities for each class, and classifying said document into the class with the largest sum of probabilities.

14. The method of claim 13 wherein determining one or more metrics includes generating, for each classifier engine, a list of probabilities of said document being classified by each classifier engine into each one of a group of possible classes, and wherein classifying said document includes summing said probabilities for each class and classifying said document into the class with the largest sum of probabilities.

15. The method of claim 14 further comprising finding confidence values for each classifier engine and multiplying each classifier engine's probabilities by the corresponding classifier engine confidence value prior to summing said probabilities for each class.

16. The method of claim 15 further comprising finding a transformation exponent for each classifier engine and transforming each classifier engine's probabilities by raising the probabilities to a power of the corresponding transformation exponent prior to multiplying each classifier engine's probabilities by the corresponding classifier engine confidence value.

17. The method of claim 16 wherein said transformation exponent for each classifier engine is iteratively optimized using a set of training documents.

18. The method of claim 13 further comprising finding confidence values for each classifier engine and multiplying each classifier engine's probabilities by the corresponding classifier engine confidence value prior to summing said probabilities for each class.

19. A method of classifying a document comprising:
using a processor (or computer) to perform the steps of:
determining one or more metrics for each classifier engine;
using said metrics to determine how to use said classifier engines to classify said document;
classifying said document accordingly;
using said metrics to rank said classifier engines from best to worst, and wherein classifying said document includes:
generating, for each classifier engine, a list of probabilities of said document being classified by each classifier engine into each one of a group of possible classes;
determining if the best classifier engine has a highest probability that is greater than the highest probability of each other classifier engine by a predetermined amount;
if so, using output from said best classifier engine to classify said document; and
if not, summing said probabilities for each class, and classifying said document into the class with the largest sum of probabilities.

20. The method of claim 19 further comprising finding confidence values for each classifier engine and multiplying each classifier engine's probabilities by the corresponding classifier engine confidence value prior to determining if the best classifier engine has a highest probability that is greater than the highest probability of each other classifier engine by a predetermined amount.

21. The method of claim 19 wherein said classifier engines are ranked from best to worst based on engine accuracy.

22. A method of classifying a document comprising:
using a processor (or computer) to perform the steps of:
determining one or more metrics for each classifier engine;
using said metrics to determine how to use said classifier engines to classify said document;
classifying said document accordingly;
using said metrics to rank said classifier engines from best to worst, and wherein classifying said document includes:
generating, for each classifier engine, a list of probabilities of said document being classified by each classifier engine into each one of a group of possible classes;
determining if the best classifier engine has a highest probability that exceeds a predetermined threshold;
if so, using output from said best classifier engine to classify said document; and if not, summing said probabilities for each class, and classifying said document into the class with the largest sum of probabilities.

23. The method of claim 22 further comprising finding confidence values for each classifier engine and multiplying each classifier engine's probabilities by the corresponding classifier engine confidence value prior to determining if the best classifier engine has a highest probability that exceeds a predetermined threshold.

24. The method of claim 22 wherein said classifier engines are ranked from best to worst based on engine accuracy.

25. A document classifier comprising:
a plurality of classifier engines;
means for generating a metric for each classifier engine;
means for comparing said metrics; and
means for classifying a document using output from one or more of said classifier engines in response to said means for comparing; wherein
said means for generating a metric generates, for each classifier engine, a list of probabilities of said document being classified by each classifier engine into each one of a group of possible classes, and wherein said means for comparing sums said probabilities for each class and identifies the class with the largest sum of probabilities, wherein
said means for generating a metric further generates a precision value for each classifier engine, and wherein said means for comparing identifies a highest precision value and a second highest precision value and determines if said highest precision value is greater than said second highest precision value by a predetermined amount, and wherein said means for classifying classifies said document using output from the classifier engine having said highest precision value to classify said document if said highest precision value is greater than said second highest precision value by a predetermined amount and classifies said document into the class with the largest sum of probabilities if said highest precision value is not greater than said second highest precision value by a predetermined amount.

26. The document classifier of claim 25 further comprising means for weighting said probabilities for each class.

27. The document classifier of claim 25 further comprising means for transforming said probabilities for each class.

28. The document classifier of claim 25 wherein said means for classifying classifies said document into the class with the largest sum of probabilities.

* * * * *

UNITED STATES PATENT AND TRADEMARK OFFICE
CERTIFICATE OF CORRECTION

PATENT NO. : 7,499,591 B2  Page 1 of 1
APPLICATION NO. : 11/090788
DATED : March 3, 2009
INVENTOR(S) : Steven J. Simske et al.

It is certified that error appears in the above-identified patent and that said Letters Patent is hereby corrected as shown below:

In column 8, line 52, delete "a" and insert -- $\alpha$ --, therefor.

In column 12, line 5, in Claim 1, after "comprising:"
insert -- providing a plurality of classifier engines; --.

In column 12, line 19, in Claim 1, after "generating" insert -- , --.

In column 12, line 53, in Claim 7, after "comprising:"
insert -- providing a plurality of classifier engines; --.

In column 13, line 13, in Claim 10, after "comprising:"
insert -- providing a plurality of classifier engines; --.

In column 13, line 39, in Claim 13, after "comprising:"
insert -- providing a plurality of classifier engines; --.

In column 14, line 21, in Claim 19, after "comprising:"
insert -- providing a plurality of classifier engines; --.

In column 14, line 51, in Claim 22, after "comprising:"
insert -- providing a plurality of classifier engines; --.

Signed and Sealed this

Twenty-fourth Day of August, 2010

David J. Kappos
*Director of the United States Patent and Trademark Office*